United States Patent
Yokochi

(10) Patent No.: US 7,291,400 B2
(45) Date of Patent: Nov. 6, 2007

(54) DECORATIVE SHEET

(75) Inventor: Eiichiro Yokochi, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/508,023

(22) PCT Filed: Mar. 19, 2003

(86) PCT No.: PCT/JP03/03352

§ 371 (c)(1),
(2), (4) Date: Oct. 29, 2004

(87) PCT Pub. No.: WO03/078161

PCT Pub. Date: Sep. 25, 2003

(65) Prior Publication Data

US 2005/0129970 A1 Jun. 16, 2005

(30) Foreign Application Priority Data

Mar. 20, 2002 (JP) ............................. 2002-077925

(51) Int. Cl.
*B32B 29/04* (2006.01)
(52) U.S. Cl. .................. 428/511; 428/413; 428/480; 428/500; 428/515; 428/523; 428/537.5; 524/444; 524/447
(58) Field of Classification Search ............. None
See application file for complete search history.

(56) References Cited

U.S. PATENT DOCUMENTS

| | | | | |
|---|---|---|---|---|
| 4,470,058 A | * | 9/1984 | Bodmer et al. | 503/212 |
| 6,486,903 B1 | * | 11/2002 | Wagner et al. | 347/212 |
| 6,827,993 B2 | * | 12/2004 | Horiuchi | 428/32.39 |
| 6,846,538 B2 | * | 1/2005 | Sato et al. | 428/40.1 |
| 2003/0091912 A1 | * | 5/2003 | Ueda et al. | 430/19 |
| 2003/0152752 A1 | * | 8/2003 | Tokiyoshi et al. | 428/195 |

FOREIGN PATENT DOCUMENTS

| | | | | |
|---|---|---|---|---|
| JP | 61-279590 A | * | 12/1986 | |
| JP | 1-82983 A | * | 3/1989 | |
| JP | 3-146341 A | * | 6/1991 | |
| JP | 5-269935 | | 10/1993 | |
| JP | 6-65898 | * | 3/1994 | |
| JP | 2001-20200 | | 1/2001 | |
| JP | 2001-54934 | | 2/2001 | |
| JP | 2005313411 A | * | 11/2005 | |

* cited by examiner

*Primary Examiner*—Marc S. Zimmer
(74) *Attorney, Agent, or Firm*—Ladas & Parry LLP

(57) ABSTRACT

The present invention improves a surface protective layer in the resistance to marring to the extent not achieved even if the surface protective layer is made of a crosslinked cured product of an ionizing radiation-curable resin and added with silica. When forming a layer comprising the crosslinked cured product of the ionizing radiation-curable resin as a surface protective layer (2) on a substrate sheet (1) made of paper or the like, fired kaolin is contained as a filler in the surface protective layer. The fired kaolin is preferably surface-treated with a silane coupling agent. On the substrate sheet (1), a wholly solid layer (3) and a pattern layer (4) are generally provided. A primer layer may be optionally provided between the substrate sheet and the surface protective layer.

5 Claims, 1 Drawing Sheet

DECORATIVE SHEET

TECHNICAL FIELD

The present invention relates to a decorative sheet such as a decorative paper or the like, which can be used for: interior decoration material for buildings such as a wall or the like; and surface material for fittings such as a door, furniture or the like. Particularly, the present invention relates to a decorative sheet which has relatively low chance of change in gloss due to surface damage and excellent resistance to marring.

BACKGROUND ART

Conventionally, a decorative sheet using paper, resin sheet or the like, or a decorative material in a form of plate or the like wherein the decorative sheet is applied to an adherend substrate has been used for various purposes such as an interior decoration material of building, fittings or the like. Also, such a decorative sheet or a decorative material to which the decorative sheet is applied usually requires surface strength including surface hardness against damage or resistance to abrasion. Thus, conventionally, a decorative sheet for such uses requiring surface strength often has a structure wherein a surface protective layer made of a crosslinked cured product such as two component (two solution) curing type resin, ionizing radiation-curable resin or the like is provided on the whole surface.

However, although the crosslinked cured product of ionizing radiation-curable resin was used for the surface protective layer, there were cases that surface damages were not sufficiently prevented. In order to deal with such cases, a filler such as silica or the like has been generally added to the surface protective layer to harden the surface protective layer. But still, particularly in the case of a decorative sheet a surface gloss of which is adjusted by a surface protective layer for depicting design, gloss could increase due to a collection of very fine scratches. That is the case, for example, when plural decorative plates respectively produced by applying a decorative sheet to a substrate of a wood plate or the like are piled up during transport and surfaces of the decorative plates (decorative sheets) are scratched by vibration, or when decorative plates are handled in a production line. It is still better if fine scratches are uniformly found on whole surface. But if just one part of a surface is frequently scratched, gloss on the surface becomes uneven and stands out resulting in a product defect. Particularly, there has been a problem that loss in cost of a product defect found after a decorative sheet was applied to a substrate is larger than that of solely a defect in a decorative sheet since not only the decorative sheet but also the substrate becomes defective. Therefore, it has been desired for a decorative sheet to have resistance to marring so that it is less likely to change gloss even if the surface is rubbed.

DISCLOSURE OF INVENTION

Accordingly, an object of the present invention is to improve resistance to marring of a decorative sheet such as a decorative paper or the like.

In order to attain the above object, a decorative sheet of the present invention has features so as to comprises a substrate sheet laminated with at least a surface protective layer comprising a crosslinked cured product of an ionizing radiation-curable resin, wherein the surface protective layer contains fired kaolin as a filler.

By adding the fired kaolin as a filler in a surface protective layer comprising a crosslinked cured product of an ionizing radiation-curable resin as mentioned above, resistance to marring improves and becomes favorable.

In addition to the above mentioned features, the fired kaolin for the decorative sheet of the present invention is surface-treated with a silane coupling agent.

Thus, by adding fired kaolin which is surface-treated with a silane coupling agent, resistance to marring further improves and becomes favorable.

Also, a decorative sheet of the present invention in any of the above features further has a primer layer provided between a substrate sheet and a surface protective layer.

By providing the primer layer as above, adhesion between a surface protective layer and a substrate sheet improves and peeling, chipping and defect of the surface protective layer are prevented.

Figure 1A:
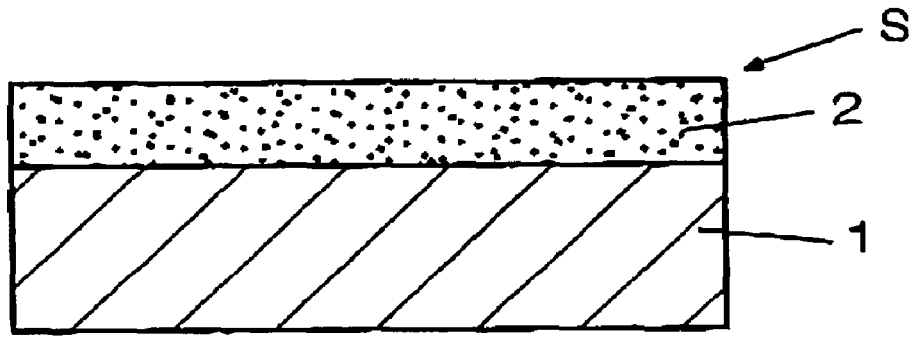
FIG. 1(A) and FIG. 1(B) are sectional views respectively showing an example of an embodiment of a decorative sheet of the present invention.

The numerical symbol in each figure refers to the following: a substrate sheet (1); a surface protective layer (2); a wholly solid layer (3); a pattern layer (4); a penetration-inhibiting layer (5); a penetrable pattern layer (6), a concavo-convex layer (7); a decorative sheet (S).

BEST MODE FOR CARRYING OUT THE INVENTION

The embodiment of the present invention will be hereinafter explained with reference to the drawings.

Outline

Figure 1B:
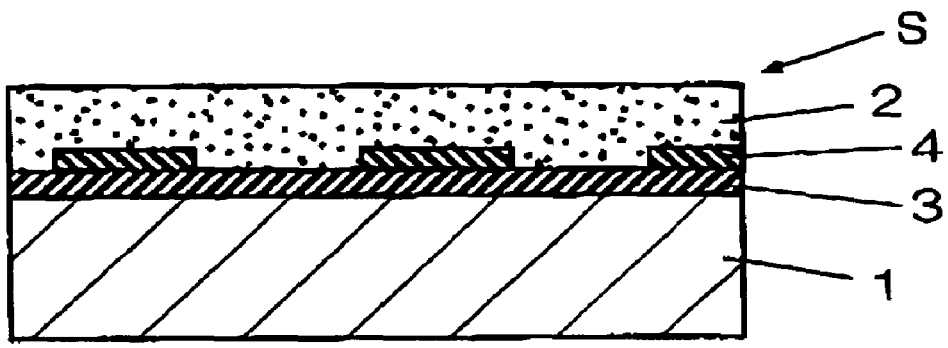

Firstly, FIG. 1 is a sectional view showing a decorative sheet S of the present invention. FIG. 1(A) shows the most basic layer constitution comprising two layers, i.e. a substrate sheet 1 and a surface protective layer 2. FIG. 1(B) shows a constitution wherein a wholly solid layer 3 and a pattern layer 4 are provided in this order on the substrate sheet 1 between the substrate sheet 1 and the surface protective layer 2 as decoration treatment. The surface protective layer 2 is made of a crosslinked cured product of ionizing radiation-curable resin, and fired kaolin is added as a filler. The present invention has found out that resistance to marring improves if fired kaolin is used as a filler instead of just an ordinary kaolin.

A decorative sheet of the present invention may be comprised of two layers, i.e. a substrate sheet 1 and a surface protective layer 2, as shown in FIG. 1(A). However, a constitution of a decorative sheet usually has some decoration treatment to improve design as shown in FIG. 1(B). Generally, the decoration treatment is applied to the substrate sheet. A substrate sheet may be a resin sheet. If a substrate sheet is made of paper or the like, such a decorative sheet may be called as a decorative paper.

Hereinafter, the present invention will be explained in detail for each layer in order.

Substrate Sheet

As a substrate sheet 1, there may be used papers, nonwoven fabrics, thermoplastic resin sheets, laminates thereof or the like.

As papers, there may be used tissue papers, kraft papers, wood free papers, linter papers, baryta papers, parchment papers, Japanese papers or the like.

As nonwoven fabrics, there may be used nonwoven fabrics made from fibers made of polyester resin, acrylic resin, nylon, vinylon, glass or the like. Papers and nonwoven fabrics generally have a basis weight of about 20 to 100 g/m$^2$. Further, in order to intensify strength between fibers or layers and prevent fuzz, a resin such as acrylic resin, styrene-butadiene rubber, melamine resin, urethane resin or the like may be further added to papers or nonwoven fabrics (the resin is impregnated after making paper or filled inside while making paper).

A decorative sheet using a paper (or a nonwoven fabric) as a substrate sheet becomes a decorative paper.

As thermoplastic resin sheets, there may be used acrylic resins, polyester resins, polyolefin based resins, polyvinyl chloride resins, polystyrene, ABS resins, polycarbonate resins, polyamide resins or the like.

Specifically, for example, (1) polyolefin resins such as polyethylene (high, medium, or low density), polypropylene (isotactic type or syndiotactic type), polybutene, ethylene-propylene copolymer, ethylene-propylene-butene copolymer, olefin based thermoplastic elastomer or the like. The olefin based thermoplastic elastomer is comprised of a mixture of a hard segment including crystalline polyolefin resin as exemplified above and a soft segment including elastomer such as ethylene-propylene rubber, ethylene-propylene-diene rubber, atactic polypropylene, styrene-butadiene rubber, hydrogenated styrene-butadiene rubber or the like. The mixing ratio of the hard segment and the soft segment is approximately (soft segment/hard segment)=5/95 to 40/60 (mass ratio). As required, the elastomer component is crosslinked by a well-known crosslinking agent such as sulfur, hydrogen peroxide or the like.

(2) Acrylic resins such as polymethyl(meth)acrylate, polybutyl(meth)acrylate, methyl(meth)acrylate-butyl(meth) acrylate copolymer, methyl(meth)acrylate-styrene copolymer or the like (herein, (meth)acrylate refers to acrylate or methacrylate).

(3) Polyester resins such as polyethylene terephthalate, polybutylene terephthalate, ethylene-terephthalate isophthalate copolymer, polyethylene naphthalate, polyester based thermoplastic elastomer, amorphous polyester or the like. As the polyester based thermoplastic elastomer, there may be a blockpolymer using highly crystalline aromatic polyesters having high melting point as the hard segment and amorphous polyether having a glass transition temperature of −70° C. or less as the soft segment. As the highly crystalline aromatic polyesters having high melting point, there may be used polybutylene terephthalate. As the amorphous polyether, there may be used polytetramethylene glycol or the like. A typical example of the amorphous polyester is ethyleneglycol-1,4-cyclohexanedimethanol-terephthalic acid copolymer.

(4) As other resins, there may be polycarbonate resin, polyvinyl chloride resin, polyamide resin, polyphenylene sulfide, polyether ether ketone or the like.

The layer constitution of the substrate sheet may be a single layer using said paper, nonwoven fabric, thermoplastic resin sheet or the like or two or more layers using different kinds. The thickness (total thickness in the case of a laminate) of the substrate sheet is normally about 25 to 500 µm.

Surface Protective Layer

A surface protective layer 2 is formed as the outermost surface layer of a decorative sheet by using an ionizing radiation-curable resin and curing the resin by crosslinking to be a crosslinked cured product. Firstly, the use of the ionizing radiation-curable resin as the resin of the surface protective layer makes it easier to impart wear resistance such as resistance to marring or the like or surface properties such as resistance to staining or the like due to high crosslinking ability of the ionizing radiation-curable resin compared to the case using two component curing type urethane resin or the like. Secondly, fired kaolin is added as a filler in the surface protective layer. Thereby, resistance to marring improves.

The surface protective layer is usually formed as an uncolored transparent layer or a colored transparent layer in order to have a pattern layer generally provided on the underside of the surface protective layer see through. However, if it is not necessary to have the pattern layer see through in such a case that there is no pattern layer or the like, the surface protective layer may be an uncolored opaque layer or a colored opaque layer.

The surface protective layer can be formed in such manner that the ionizing radiation-curable resin (composition) in which fired kaolin is contained and liquidized is applied on a substrate sheet by a conventional layer forming method including coating methods such as gravure coating, roll coating or the like, or printing methods such as gravure printing, gravure offset printing, screen printing or the like, and thereafter irradiating it with an ionizing radiation to cure by crosslinking. The thickness of the surface protective layer is generally about 1 to 30 g/m$^2$ (based on solid content) in coating amount. Solvents are accordingly added to the ionizing radiation-curable resin (composition) for adjustment of coatability, printability or the like.

As the ionizing radiation-curable resin, there may be preferably used a composition which is curable by crosslinking with ionizing radiation and comprised of a suitable mixture of prepolymers (so called oligomers are included) and/or monomers, each of which has a radically polymerizable unsaturated bond(s) or a cationically polymerizable functional group(s) in the molecule thereof. Ionizing radiation used herein refers to electromagnetic radiations or charged particle beams which have energy quanta capable of polymerizing and crosslinking molecules. Generally, ionizing radiation refers to electron beam (EB) or ultraviolet light (UV).

The prepolymer or monomer may be a compound having a radically polymerizable unsaturated group such as a (meth) acryloyl group, (meth) acryloyloxy group or the like, a cationically polymerizable functional group such as epoxy group or the like in the molecule thereof. The prepolymer and monomer may be used solely or in mixture of plural kinds. Herein, for example, a (meth)acryloyl group refers to an acryloyl group or a methacryloyl group. As the ionizing radiation-curable resin, there may be preferably used a polyene/thiol based prepolymer, which is a combination of polyene and polythiol.

As examples of the prepolymer having a radically polymerizable unsaturated group in the molecule thereof, there may be used polyester(meth)acrylate, urethane(meth)acrylate, epoxy(meth)acrylate, melamine(meth)acrylate, triazine (meth)acrylate or the like. Generally, prepolymers having molecular weight of about 250 to 100,000 are used. The term, (meth)acrylate used herein refers to acrylate or methacrylate. A acrylate compound and a methacrylate compound may be named generically and simply referred as acrylate (compound).

Examples of the monomer having radically polymerizable unsaturated group in the molecule thereof are monofunctional monomers such as methyl(meth)acrylate, 2-ethylhexyl(meth)acrylate, phenoxyethyl(meth)acrylate or the like, and polyfunctional monomers such as diethyleneglycoldi(meth)acrylate, propyleneglycoldi(meth)acrylate, trimethylolpropanetri(meth)acrylate, trimethylolpropaneethyleneoxidetri(meth) acrylate, dipentaerythritoltetra(meth)acrylate, dipentaerythritolpenta(meth)acrylate, dipentaerythritolhexa(meth)acrylate or the like.

Examples of the prepolymer having cationically polymerizable unsaturated group in the molecule thereof are epoxy resins such as bisphenol epoxy resins, novolak epoxy compounds or the like, vinyl ether resins such as fatty acid vinyl ether, aromatic vinyl ether or the like.

As thiol, there may be polythiol such as trimethylolpropane trithioglycolate, pentaerythritoltetrathioglycolate or the like. As polyene, there may be polyurethane comprising diol and diisocyanate with allyl alcohol added on both ends.

In order to cure by crosslinking using ultraviolet ray, a photo polymerization initiator is added to the ionizing radiation-curable resin. In the case of resins having radically polymerizable unsaturated group, acetophenones, benzophenones, thioxanthones, benzoins or benzoinmethyl ethers may be used solely or in mixture thereof as the photo polymerization initiator. In the case of resins having cationically polymerizable functional group, aromatic diazonium salt, aromatic sulfonium salt, aromatic iodonium salt, metallocene compound, benzoin sulfonic ester or the like may be used solely or in mixture thereof as the photo polymerization initiator.

The amount of the photo polymerization initiator added ranges from about 0.1 to 10 parts by mass to 100 parts by mass of the ionizing radiation-curable resin.

Further to the ionizing radiation-curable resin besides the above resins, if necessary, ionizing radiation non-curing resins may be added, for instance, thermoplastic resins such as vinyl chloride-vinyl acetate copolymer, vinyl acetate resin, acrylic resin, cellulose resins or the like.

The fired kaolin is obtained by firing commonly used (hydro) kaolin. By adding fired kaolin as a filler, improvement in resistance to marring which has not been achieved by silica or unfired hydrokaolin is attained. A particle diameter of fired kaolin powder may be selected according to uses, required physical properties or the like. For example, fired kaolin having an average particle diameter of about 0.5 to 2 μm may be used. The amount of fired kaolin added may be selected according to uses, required physical properties or the like For example, the amount of fired kaolin added may be about 5 to 50 parts by mass based on 100 parts by mass of an ionizing radiation-curable resin (a total amount of an ionizing radiation-curable resin and other binder resins if a surface protective layer further contains other binder resins).

A refractive index of fired kaolin approaches that of the resin of the surface protective layer when the refractive index of fired kaolin is within the range of 1.6 to 1.7, particularly at 1.65, a center value thereof (a refractive index of hydrokaolin is 1.56), thus, using fired kaolin is advantageous in terms of transparency of the surface protective layer. Also, fired kaolin is superior in coating stability to hydrokaolin.

As fired kaolin, there may be used a fired kaolin in which its surface is further subjected to surface treatment. By using the surface-treated fired kaolin, the effect of improvement in resistance to marring can be further increased. The surface treatment may be that using a silane coupling agent.

As the silane coupling agent, there may be well known silane coupling agents containing alkoxy group, amino group, vinyl group, epoxy group, mercapto group, chloride group or the like.

For example, there are γ-aminopropyltriethoxy silane, γ-methacryroxypropyltrimethoxy silane, γ-methacryroxypropyl methyldimethoxy silane, γ-methacryroxypropyldimethylmethoxy silane, γ-methacryroxypropyltriethoxy silane, γ-methacryroxy propyldimethylethoxysilane, γ-acryroxypropyltrimethoxysilane, γ-acryroxypropylmethyldimethoxy silane, γ-acryroxypropyl dimethylmethoxy silane, γ-acryroxypropyltriethoxy silane, γ-acryroxypropylmethyldiethoxy silane, γ-acryroxypropyl dimethylethoxysilane, vinyltriethoxy silane, γ-glycidoxypropyl trimethoxy silane, γ-mercaptopropyltrimethoxy silane or the like.

To the surface protective layer, other well-known additives may be accordingly added, for instance, lubricants such as silicone resin, wax or the like, colorants, stabilizing agents, fungicides or the like as required.

As a source of electron beam for the ionizing radiation, there may be used various electron beam accelerators such as Cockcroft-Walton type, Van de Graaff type, resonance transformer type, isolation core transformer type, linear type, Dynamitron type, high frequency type or the like, which radiates electron having energy quantum of 100 to 1000 keV, preferably 200 to 300 keV. As a source of the ultraviolet ray, there may be used an ultrahigh-pressure mercury-vapor lamp, a high-pressure mercury-vapor lamp, a low-pressure mercury-vapor lamp, a carbon-arc lamp, a black light, a metal halide lamp or the like.

Design Treatment

A constitution of a decorative sheet may be simply two layers comprised of a substrate sheet and a surface protective layer or may have a primer layer made of two component curing type urethane resin or the like between the substrate sheet and the surface protective layer for increasing adhesion. However, a constitution of the decorative sheet generally is to be subjected to some decoration treatment in order to increase design effect. Even in the case of a decorative sheet mainly comprised of a substrate sheet and a surface protective layer, it is possible to apply decoration treatment. For example, if the substrate sheet is a resin sheet, decoration treatment may be applied by adding colorant to the resin sheet, by using a colored paper, or by adding a colorant to the surface protective layer or the like. However, it is not capable of presenting advanced design by printed pattern or the like, thus, a pattern layer or the like is generally provided for exhibiting advanced design. There is no particular limit in contents of the decoration treatment. Various conventional decoration treatments in the field of a decorative sheet may be adopted accordingly. Hereinafter, as examples of the decoration treatment, a pattern layer, a wholly solid layer and formation concavo-convex pattern on a surface will be explained.

Pattern Layer

A pattern layer 4 is a layer for exhibiting design formed by partial printing in a form of pattern. It is preferable to provide the pattern layer as an inner layer of a decorative sheet in view of durability of pattern. Hence, the pattern layer is located between a substrate sheet and a surface protective layer, and generally formed on an upper side surface of the surface sheet.

Upon providing the pattern layer, there is no particular limit in contents of the pattern layer such as a method of forming the pattern layer, materials, design or the like, and may be according to the uses. The pattern layer is usually formed using an ink by a conventional printing method or the like such as gravure printing, silk screen printing, offset printing, gravure offset printing, ink jet printing or the like.

Patterns of the pattern layer include, for example, woodgrain patterns, rift patterns, sand grain patterns, texture patterns, tile patterns, brick patterns, leather grain patterns, letters, symbols, geometric figures, or a combination of two or more kinds thereof.

The ink used for forming the pattern layer is comprised of vehicles including binders or the like, colorants such as pigments, dyes or the like, various additives added accordingly such as extenders, stabilizing agents, plasticizers, catalysts, curing agents or the like. A resin of the binders may be selected from thermoplastic resins, thermosetting resins, ionizing radiation-curable resins or the like according to the required physical properties, printability or the like. For example, cellulose resins such as cellulose nitrate, cellulose acetate, cellulose acetate propionate or the like; acrylic resins such as polymethyl (meth)acrylate, polybutyl (meth)acrylate, methyl (meth)acrylate-butyl (meth)acrylate-2-hydroxyethyl (meth)acrylate copolymer or the like; urethane resins; vinyl chloride-vinyl acetate copolymer; polyester resins; alkyd resins or the like may be used solely or as a mixture containing thereof for the resin of the binder.

The colorants usable herein include: inorganic pigments such as titanium white, carbon black, iron black, red iron oxide, chrome yellow, ultramarine blue or the like; organic pigments such as aniline black, quinacridone red, isoindolinone yellow, phthalocyanine blue or the like; luster pigments such as flake powders of titanium dioxide covered mica, aluminum or the like; or other dyes.

Wholly Solid Layer

A wholly solid layer 3 is a layer formed on whole surface between a substrate sheet and a surface protective layer, which may be solely provided not in combination with the aforementioned pattern later 4, however, generally, it is often used as an undercoat of the pattern layer 4 in combination with the pattern later 4.

When providing the wholly solid layer, there is no particular limit in forming methods, materials or the like of the wholly solid layer, which may be selected according to the uses. The wholly solid layer is formed using an ink or a coating liquid by a conventional printing method such as gravure printing, silkscreen printing, offset printing, gravure offset printing, ink jet printing or the like, or a conventional coating method such as gravure coating, roll coating or the like. The thickness of the wholly solid layer is generally about 1 to 10 g/m$^2$ (based on solid content) in coating amount.

There are various purposes to provide the wholly solid layer 3, for instance, achieving one or more functions among (1) exhibiting a base color, (2) imparting hiding properties, (3) inhibiting penetration or the like. (1) Exhibiting a base color generally refers to rendering an undercoat color for pattern coloration of a pattern layer. (2) Imparting hiding properties refers to stabilizing coloration of a decorative sheet by hiding unevenness of color tone between lots in the case of a substrate sheet using paper or a colored resin sheet, or stabilizing exhibition of coloration or pattern of a decorative sheet by hiding an adherend substrate in the case of a substrate sheet using a transparent resin sheet or the like. (3) Inhibiting penetration refers to preventing generation of gloss unevenness or the like on a surface of a surface protective layer by inhibiting an ink or a coating liquid from penetrating to a substrate sheet upon forming a pattern layer, the surface protective layer or the like in the case of a penetrable substrate sheet such as paper or the like. Among these functions, (1) and (2) are decoration treatment. The wholly solid layer of the present invention includes embodiments solely for the use directed to a purpose other than the decoration treatment such as (3).

The wholly solid layer functions variously as mentioned above according to the uses, wherein same materials as the ink materials described in the aforementioned patter layer can be used. Thus, detailed explanation on a resin of a binder or the like is hereby omitted. In order to exhibit a base color or impart hiding properties, various colorants such as titanium white or the like listed in the aforementioned pattern layer may be added, however, in terms of inhibiting penetration, it is not necessary to add a colorant for the purpose of coloring.

Forming Concavo-convex Pattern on a Surface

Forming a concavo-convex pattern on a surface is a decoration treatment to form a concavo-convex pattern on a surface of a surface protective layer. The effect of improvement in resistance to marring according to the present invention can be obtained even if there is a concavo-convex pattern on a surface of a decorative sheet, for instance, a concavo-convex pattern like a concavo-convex pattern of woodgrain vessel grooves wherein convex portions other than concave portions comprise a flat surface and function as a gloss regulating surface. In this case, the resistance to marring is resistance against change in gloss of the flat surface (convex portions) from the view point of the micro level.

The change in gloss of a surface covered by the resistance to marring generally includes increase of gloss in the case that surface gloss is appropriately decreased to adjust gloss (i.e. medium gloss) as a design, that is, appearance of gloss as the result of deterioration of the matte effect of the surface. However, change in gloss covered by the resistance to marring also includes decrease in gloss as well as increase in gloss.

As the concavo-convex pattern, a pattern is employed according to the uses, for instance, woodgrain vessel grooves, joint grooves of tile laying or bricklaying, relief patterns, letters, symbols, geometric figures, satin finished surfaces, concavo-convex patterns on cleavage plane of granite or the like. The concavo-convex pattern may be a combination of these patterns.

Figure 2:
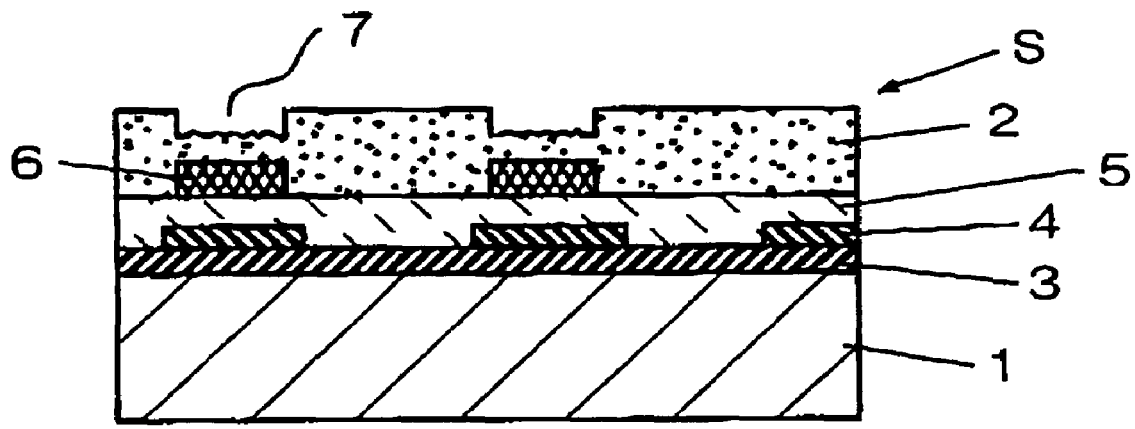
FIG. 2 is a sectional view showing another example of an embodiment of a decorative sheet of the present invention.

As an example of the decoration treatment for forming the concavo-convex pattern such as woodgrain vessel grooves or the like on a surface, there is a technique to form a concavo-convex pattern by providing a penetrable hill-and-dale pattern as an undercoat prior to forming a surface protective layer using a coating liquid (or an ink) for forming a surface protective layer (see FIG. 2 and Japanese Patent Application Laid-Open (JP-A) No. 2001-328228 or the like). For example, a penetrable pattern layer 6 in a pattern form is formed by accordingly providing a wholly solid layer 3 and a pattern layer 4 on a substrate sheet 1, forming a penetration-inhibiting layer 5 by coating a resin liquid on whole surface, and printing an ink in which a filler such as silica or the like is added in order to impart penetration. The penetrable pattern layer is, for instance, a layer accordingly depicting a design of a concavo-convex pattern such as a vessel groove pattern or the like. A coating liquid for forming a surface protective layer may be coated on whole surface of the penetrable pattern layer, thereby, the coating liquid on the upper part of the penetrable pattern layer 6 penetrates into inside of the penetrable pattern layer. However, the coating liquid on the upper part of the penetration-inhibiting layer 5 does not penetrate into inside of the penetration-inhibiting layer. Therefore, a concavo-convex pattern 7 having a concave on every penetrable pattern layer 6 is formed on the surface of the surface protective layer 2. According to the concavo-convex pattern forming technique, inside of the formed concave of the concavo-convex pattern 7 can be a rough surface, thus, it is possible to render a design using differences of gloss between convex portions and portions (see FIG. 2).

Primer Layer

A primer layer is provided preferably between a surface protective layer and a substrate sheet in the case that the strengthening of inter-layer adhesion between the surface protective layer and the substrate sheet is necessary. The location for forming the primer layer is, for instance, if there is a pattern layer between a substrate sheet and a surface protective layer, the location of the primer layer is between the pattern layer and the surface protective layer or the like.

As the primer layer, a resin such as urethane resins, acrylic resins, polyvinyl butyral or the like may be used solely or in mixture of one or more kids thereof. The primer layer is formed using a coating liquid (or an ink) made of the above resin by a conventional coating method such as gravure coating, roll coating or the like, or a conventional printing method such as gravure printing or the like. The thickness of the primer layer is generally about 0.5 to 5 g/m$^2$ (based on solid content) in coating amount.

Adherend Substrate

A decorative sheet of the present invention may be used as a decorative material such as a decorative plate by applying the decorative sheet to a surface of various adherend substrates.

There is no particular limitation to the adherend substrate. For example, material of the adherend substrate may be inorganic nonmetals, metals, woods, plastics or the like. Specifically, as nonmetals, there may be non-pottery ceramic materials such as paper-making cement, extrusion cement, slag cement, ALC (aerated lightweight concrete), GRC (glass fiber-reinforced concrete), pulp cement, wood chip cement, asbestos cement, calcium silicate, gypsum, gypsum slag or the like; or inorganic materials such as ceramics such as biscuit wares, earthenwares, porcelains, stonewares, glass, porcelain enamels or the like. As metals, there may be metal materials such as iron, aluminum, copper or the like. As woods, there may be veneers, plywoods, particle boards, fiber boards, laminated woods or the like made of cedar, cypress, oak, lauan, teak or the like. As plastics, there may be resin materials such as polypropylene, ABS resin, phenolic resin or the like.

The form of the adherend substrate may be a flat plate, a curved plate, a polygonal prism or the like.

Application

The use of a decorative sheet of the present invention may not particularly be limited. The decorative sheet may be used for interior decoration material of buildings for walls, ceilings or the like; surface materials for fittings such as doors, doorframes, window frames or the like; surface materials for furnishings materials such as round edges, plinths or the like; or surface materials for furniture such as chests, cabinets or the like by applying to a surface of the adherend substrate as mentioned above.

EXAMPLE

Hereinafter, the present invention will be explained in more detail with examples and comparative examples.

Example 1

Fired Kaolin

A wholly solid layer 3 and a pattern layer 4 were successively formed on a substrate sheet 1 made of a tissue paper for building materials (general paper grade, a basis weight of 30 g/m$^2$) by gravure printing, wherein the wholly solid layer 3 is white color, has hiding properties, and contains acrylic resin as a binder resin and titanium oxide as a colorant, and wherein the pattern layer 4 has woodgrain design, and contains nitrocellulose resin as a binder resin and a colorant. Next, on the laminate thus obtained, an electron beam-curable resin coating liquid of the composition mentioned below was applied by a gravure offset method. Then, the coating layer was irradiated with an electron beam to be cured by crosslinking, thereby, a surface protective layer 2, which is colorless and transparent and has thickness of 4 g/m$^2$, was formed to obtain a decorative sheet S as shown in the cross-sectional view of FIG. 1(B).

Composition of Electron Beam-curable Resin Coating Liquid:

| | |
|---|---|
| Acrylate trifunctional monomer | 50 parts by mass |
| Acrylate bifunctional monomer | 30 parts by mass |
| Silicone methacrylate | 0.6 parts by mass |
| Fired kaolin (average particle size 0.8 μm) | 30 parts by mass |

Example 2

Fired Kaolin (Surface-treated Type)

Except that the composition of the electron beam-curable resin coating liquid for forming a surface protective layer was changed to the composition mentioned below, wherein a surface-treated fired kaolin was added, a decorative sheet was produced in the same manner as Example 1.

Composition of Electron Beam-curable Resin Coating Liquid:

| | |
|---|---|
| Acrylate trifunctional monomer | 50 parts by mass |
| Acrylate bifunctional monomer | 30 parts by mass |
| Silicone methacrylate | 0.6 parts by mass |
| Fired kaolin (average particle size 0.8 μm, surface-treated by silane coupling agent) | 30 parts by mass |

Example 3

Fired Kaolin, Concavo-convex Pattern

A wholly solid layer 3, a pattern layer 4, a penetration-inhibiting layer 5 and a penetrable layer 6 were successively formed on a substrate sheet 1 made of a tissue paper for building materials (general paper grade, a basis weight of 30 g/m$^2$) by gravure printing, wherein the wholly solid layer 3 is white color, has hiding properties, and contains acrylic resin as a binder resin and titanium oxide as a colorant, wherein the pattern layer 4 has woodgrain design, and contains nitrocellulose resin as a binder resin and a colorant, wherein the penetration-inhibiting layer 5 is comprised of a mixed resin of urethane resin and polyester resin, and wherein the penetrable layer 6 has a woodgrain vessel pattern consistent with a vessel portion in design of the pattern layer, contains urethane resin as a binder resin, and is added with silica. Next, on the laminate thus obtained, an electron beam-curable resin coating liquid of the composition mentioned below was applied by a gravure offset method. Then, the coating layer was irradiated with an electron beam to be cured by crosslinking, thereby, a surface protective layer 2, which is colorless and transparent and has thickness of 4 g/m², is formed to obtain a desired decorative sheet S having a surface with a concavo-convex pattern 7 of a vessel groove pattern consistent with a woodgrain design of the pattern layer as shown in the cross-sectional view of FIG. 2.

Composition of Electron Beam-curable Resin Coating Liquid:

| | |
|---|---|
| Acrylate trifunctional monomer | 50 parts by mass |
| Acrylate bifunctional monomer | 30 parts by mass |
| Silicone methacrylate | 0.6 parts by mass |
| Fired kaolin (average particle size 0.8 μm) | 30 parts by mass |

Comparative Example 1

No Kaolin, Silica

Except that the composition of the electron beam-curable resin coating liquid for forming a surface protective layer was changed to the composition mentioned below, wherein silica was added instead of fired kaolin, a decorative sheet was produced in the same manner as Example 1.

Composition of Electron Beam-curable Resin Coating Liquid:

| | |
|---|---|
| Acrylate trifunctional monomer | 50 parts by mass |
| Acrylate bifunctional monomer | 30 parts by mass |
| Silicone methacrylate | 0.6 parts by mass |
| Silica (average particle size 6 μm) | 30 parts by mass |

Comparative Example 2

Hydrokaolin

Except that the composition of the electron beam-curable resin coating liquid for forming a surface protective layer was changed to the composition mentioned below, wherein ordinary hydrokaolin was added instead of fired kaolin, a decorative sheet was produced in the same manner as Example 1.

Composition of Electron Beam-curable Resin Coating Liquid:

| | |
|---|---|
| Acrylate trifunctional monomer | 50 parts by mass |
| Acrylate bifunctional monomer | 30 parts by mass |
| Silicone methacrylate | 0.6 parts by mass |
| Hydrokaolin (average particle size 0.6 μm) | 30 parts by mass |

Comparative Example 3

Without Filler

Except that the composition of the electron beam-curable resin coating liquid for forming a surface protective layer was changed to the composition mentioned below, wherein fired kaolin was not added and a filler was not contained, a decorative sheet was produced in the same manner as Example 1.

Composition of Electron Beam-curable Resin Coating Liquid:

| | |
|---|---|
| Acrylate trifunctional monomer | 50 parts by mass |
| Acrylate bifunctional monomer | 30 parts by mass |
| Silicone methacrylate | 0.6 parts by mass |

Example 4

Resin Sheet/Fired Kaolin

A wholly solid layer 3 and a pattern layer 4 were successively formed on a substrate sheet 1 made of a polypropylene resin sheet, which is white color, has hiding properties and has thickness of 80 μm, by gravure printing, wherein the wholly solid layer 3 is white color, has hiding properties, and contains urethane resin as a binder resin and titanium oxide as a colorant, and wherein the pattern layer 4 has woodgrain design, and contains urethane resin as a binder resin and a colorant. Next, on the laminate thus obtained, an electron beam-curable resin coating liquid of the composition mentioned below was applied by gravure offset method. Then, the coating layer was irradiated with an electron beam to be cured by crosslinking, thereby, a surface protective layer 2, which is colorless and transparent and has thickness of 4 g/m², is formed to obtain a desired decorative sheet S as shown in the cross-sectional view of FIG. 1(B).

Composition of Electron Beam-curable Resin Coating Liquid:

| | |
|---|---|
| Acrylate trifunctional monomer | 50 parts by mass |
| Acrylate bifunctional monomer | 30 parts by mass |
| Silicone methacrylate | 0.6 parts by mass |
| Fired kaolin (average particle size 0.8 μm) | 30 parts by mass |

Evaluation of Performances

Resistance to marring of each decorative sheet formed in Examples and Comparative examples was evaluated. The resistance to marring was evaluated by visually observing state of change in gloss of a surface of the decorative sheet after a rubbing test (resistance to steel wool test), wherein the surface of the decorative sheet is rubbed for 20 times reciprocating motion with the use of a steel wool (BONSTAR manufactured by Nippon Steel Wool Co., Ltd.) which is fixed to a weight loading with 21014 Pa (1.5 kgf/7 cm²). The results are shown in Table 1. In the table, "⊚" refers to "excellent" without change in gloss, "○" refers to "good" with small change in gloss, "x" refers to "not good" with change in gloss of the surface, and "xx" refers to "not good (out of the question)" with a pattern layer under the surface even rubbed.

TABLE 1

Results of Performance Evaluation

| | Filler | Resistance to marring |
|---|---|---|
| Example 1 | Fired kaolin | ◯: small change in gloss |
| Example 2 | Surface-treated fired kaolin | ◎: no change in gloss |
| Example 3 | Fired kaolin | ◯: small change in gloss |
| Example 4 | Fired kaolin | ◯: small change in gloss |
| Comparative Example 1 | Silica | X: change in gloss |
| Comparative Example 2 | Hydrokaolin | X: change in gloss |
| Comparative Example 3 | None | XX: defect down to a pattern printing layer |

As shown in Table 1, the performance of each example, wherein fired kaolin was added to a surface protective layer, was good or excellent though some examples had change in gloss of the surface but the change was small. Among them, the performance of the example having fired kaolin with surface-treatment was excellent without showing any change in gloss. To the contrary, the performance of each Comparative example, wherein fired kaolin was not added even though silica or the like was added, was not good including Comparative example 2, wherein hydrokaolin was added.

INDUSTRIAL APPLICABILITY (1) According to a decorative sheet of the present invention, resistance to marring improves. For example, though depending on the constitution of a decorative sheet, the resistance to marring can be improved to the extend that change in gloss is small or ideally no change in gloss is observed when a surface of a decorative sheet is visually observed after a rubbing test as shown in examples, wherein the surface of the decorative sheet is rubbed for 20 times reciprocating motion by a steel wool (BONSTAR manufactured by Nippon Steel Wool Co., Ltd.) which is fixed to a weight loading 14009 to 42028 Pa (1 to 3 kgf/7 cm$^2$).

(2) Further, if a surface-treated fired kaolin is used in a surface protective layer, resistance to marring is more improved and becomes more preferable.

(3) Even further, by providing a primer layer between a substrate sheet and a surface protective layer, adhesion between the surface protective layer and the substrate sheet improves so that peeling, chipping, defect or the like does not occur in the surface protective layer.

The invention claimed is:

1. A decorative sheet comprising a substrate sheet laminated with at least a surface protective layer comprising a crosslinked cured product of an ionizing radiation-curable resin, on a whole surface of at least one side of the substrate sheet, wherein the surface protective layer contains fired kaolin as a filler.

2. A decorative sheet according to claim 1, wherein the fired kaolin is surface-treated with a silane coupling agent.

3. A decorative sheet according to claim 1, wherein a primer layer is provided between the substrate sheet and the surface protective layer.

4. A decorative sheet according to claim 1, wherein a pattern layer and/or a wholly solid layer are laminated between the substrate sheet and the surface protective layer.

5. A decorative sheet according to claim 1, wherein the surface protective layer contains 5 to 50 parts by mass of the fired kaolin relative to a total amount of 100 parts by mass of a binder resin containing the ionizing radiation-curable resin.

* * * * *